(12) United States Patent
Hamachi et al.

(10) Patent No.: US 11,824,237 B2
(45) Date of Patent: Nov. 21, 2023

(54) FUEL CELL SYSTEM AND METHOD OF OPERATING THE FUEL CELL SYSTEM AT LOW TEMPERATURE

(71) Applicant: HONDA MOTOR CO., LTD., Tokyo (JP)

(72) Inventors: Masakazu Hamachi, Wako (JP); Yusai Yoshimura, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 328 days.

(21) Appl. No.: 17/092,680

(22) Filed: Nov. 9, 2020

(65) Prior Publication Data

US 2021/0143454 A1 May 13, 2021

(30) Foreign Application Priority Data

Nov. 12, 2019 (JP) ................. 2019-204804

(51) Int. Cl.
*H01M 8/04223* (2016.01)
*H01M 8/04746* (2016.01)
(Continued)

(52) U.S. Cl.
CPC ..... *H01M 8/04253* (2013.01); *H01M 8/0494* (2013.01); *H01M 8/04164* (2013.01);
(Continued)

(58) Field of Classification Search
CPC ......... H01M 8/04253; H01M 8/04164; H01M 8/04179; H01M 8/04753; H01M 8/04156;
(Continued)

(56) References Cited

U.S. PATENT DOCUMENTS

2007/0298289 A1* 12/2007 Clingerman ...... H01M 8/04955
429/444
2010/0239928 A1 9/2010 Tsuchiya
(Continued)

FOREIGN PATENT DOCUMENTS

CN 101083331 A 12/2007
CN 101416341 A 4/2009
(Continued)

OTHER PUBLICATIONS

Office Action dated May 10, 2022 issued over the corresponding Japanese Patent Application No. 2019-204804 with the English translation thereof.
(Continued)

*Primary Examiner* — Christopher P Domone
(74) *Attorney, Agent, or Firm* — Carrier, Shende & Associates P.C.; Joseph P. Carrier; Jeffrey T. Gedeon

(57) ABSTRACT

A fuel cell system includes a fuel cell stack, a circulation circuit, a gas liquid separator section, a purge channel, a purge valve and an ECU. In a method of operating the fuel cell system at low temperature, after start-up of the fuel cell system, the ECU performs a freezing determination processing step of determining freezing or non-freezing of the gas liquid separator, and in the case where freezing of the gas liquid separator is determined in the freezing determination step, the ECU performs a freezing confirmation processing step of immediately opening the purge valve for predetermined time.

8 Claims, 6 Drawing Sheets

(51) Int. Cl.
  *H01M 8/04119* (2016.01)
  *H01M 8/04828* (2016.01)
  *H01M 8/04858* (2016.01)

(52) U.S. Cl.
  CPC ... *H01M 8/04179* (2013.01); *H01M 8/04753* (2013.01); *H01M 2250/20* (2013.01)

(58) Field of Classification Search
  CPC .......... H01M 8/0494; H01M 8/04302; H01M 8/04223; H01M 8/04225; H01M 8/0431; H01M 2250/20
  See application file for complete search history.

(56) References Cited

U.S. PATENT DOCUMENTS

| | | | |
|---|---|---|---|
| 2012/0107706 A1 | 5/2012 | Tanaka et al. | |
| 2016/0133963 A1 | 5/2016 | Naganuma et al. | |
| 2016/0380287 A1 | 12/2016 | Kaneko et al. | |
| 2017/0237092 A1 | 8/2017 | Ogawa et al. | |
| 2020/0127312 A1* | 4/2020 | Sakai | H01M 8/04253 |

FOREIGN PATENT DOCUMENTS

| | | |
|---|---|---|
| CN | 102804469 A | 11/2012 |
| CN | 105591130 A | 5/2016 |
| CN | 106299414 A | 1/2017 |
| CN | 107086318 A | 8/2017 |
| JP | 2006-100095 A | 4/2006 |
| JP | 2006-139924 A | 6/2006 |
| JP | 2017-168369 A | 9/2017 |

OTHER PUBLICATIONS

Office Action dated Sep. 23, 2023 issued in the corresponding Chinese Application No. 202011252841.3.

* cited by examiner

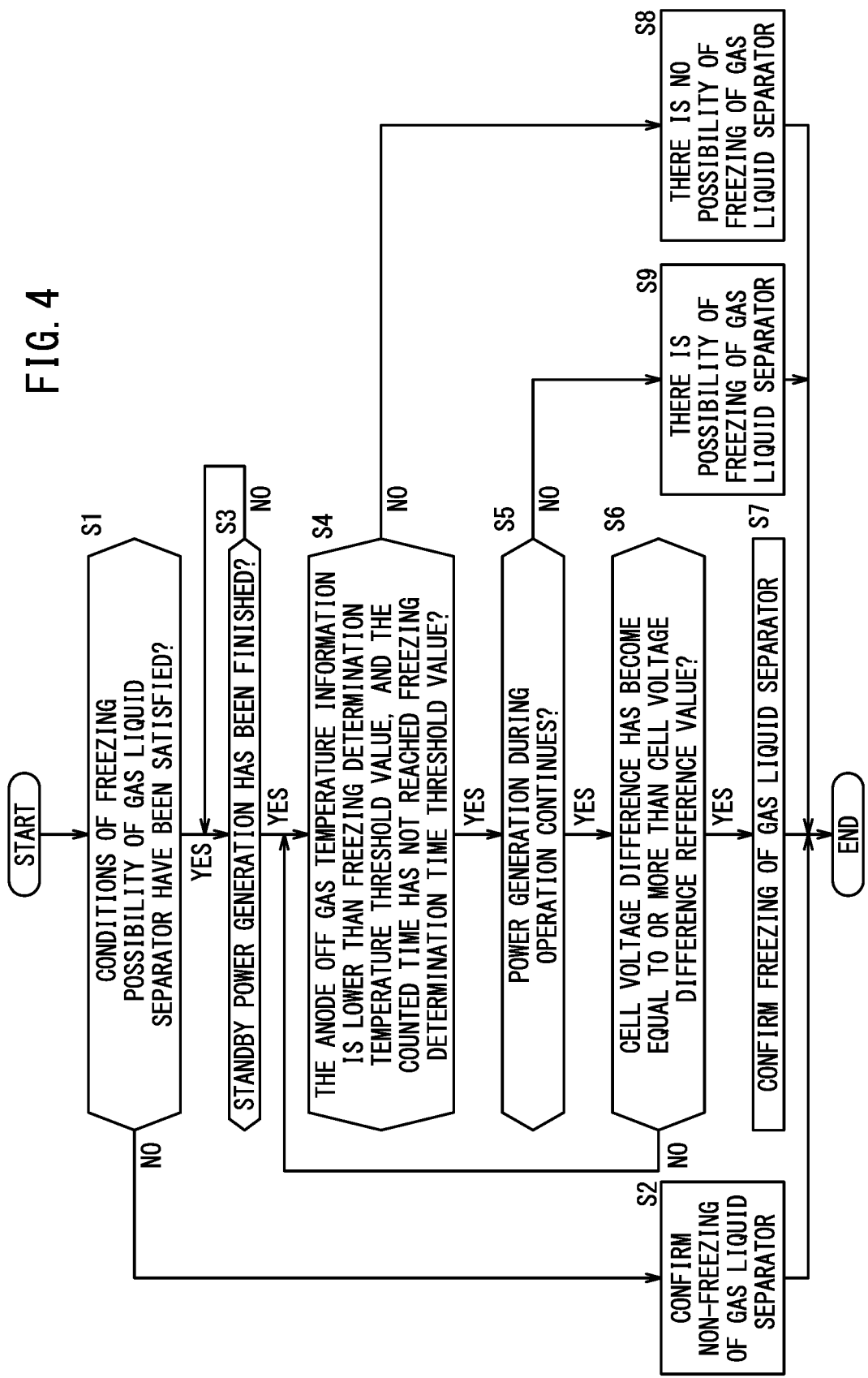

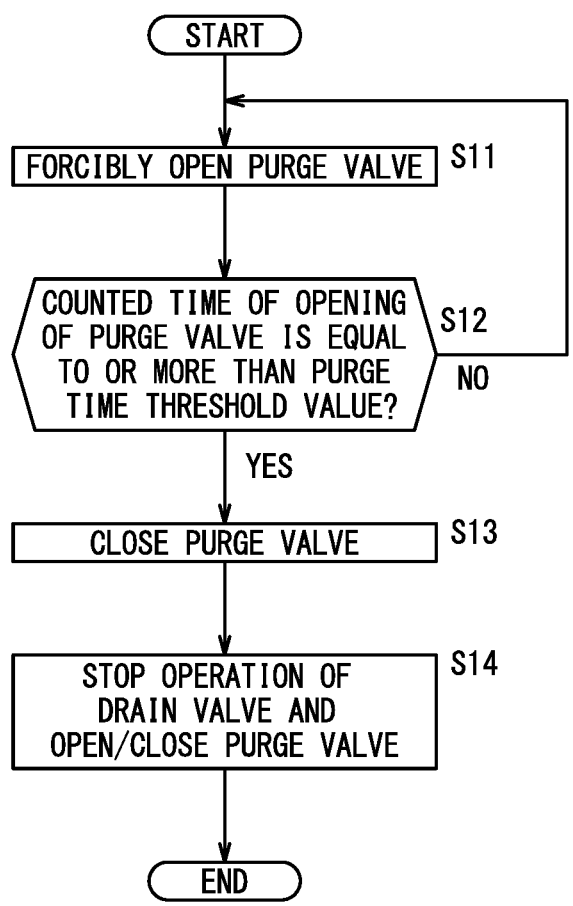

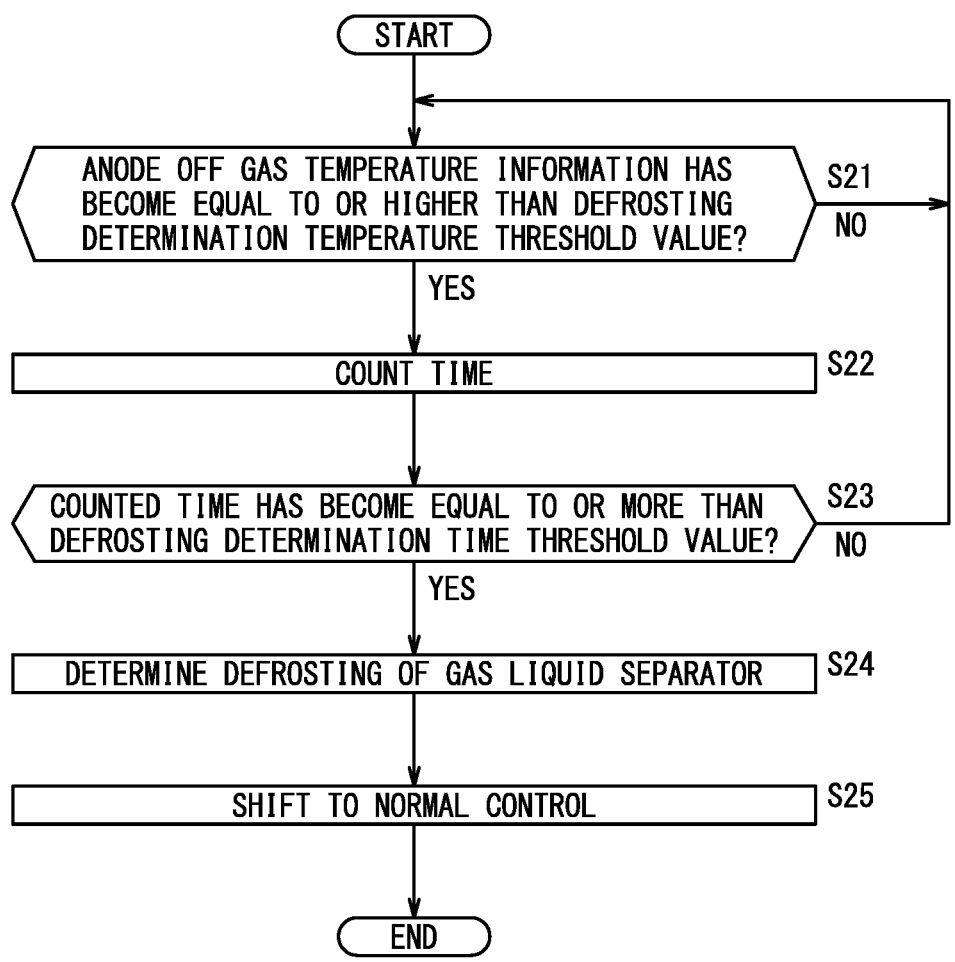

FUEL CELL SYSTEM AND METHOD OF OPERATING THE FUEL CELL SYSTEM AT LOW TEMPERATURE

CROSS-REFERENCE TO RELATED APPLICATION

This application is based upon and claims the benefit of priority from Japanese Patent Application No. 2019-204804 filed on Nov. 12, 2019, the contents of which are incorporated herein by reference.

BACKGROUND OF THE INVENTION

Field of the Invention

The present invention relates to a fuel cell system including a gas liquid separator section for separating water in an anode gas discharged from a fuel cell stack, and a method of operating the fuel cell system at low temperature.

Description of the Related Art

A fuel cell system includes a fuel cell stack for performing power generation by reactions of an anode gas (fuel gas such as hydrogen) and a cathode gas (oxygen or oxygen-containing gas), an anode system apparatus for allowing the anode gas to flow through the fuel cell stack, and a cathode system apparatus for allowing the cathode gas to flow through the fuel cell stack.

As disclosed in Japanese Laid-Open Patent Publication No. 2017-168369, the anode system apparatus forms a circulation circuit for circulating an anode off gas used in power generation of a fuel cell stack to an anode supply channel which supplies an anode gas. The circulation circuit is provided with a gas liquid separator section. The gas liquid separator section separates water (water produced in power generation) from the anode off gas. A drain channel is coupled to the gas liquid separator section for discharging the separated liquid water and some of the anode off gas.

SUMMARY OF THE INVENTION

In this regard, in the anode supply apparatus, when the temperature in the surrounding environment becomes low, and the liquid water in the gas liquid separator section is frozen, liquid water and the anode off gas containing nitrogen cannot be discharged from the drain channel easily. In particular, in the fuel cell system, at the time of stopping operation of the fuel cell system, even if a scavenging process of discharging water in the fuel cell stack and/or the gas liquid separator section is performed, the liquid water may be retained in the gas liquid separator section due to disturbance, and there is a possibility that this water is frozen.

In the fuel cell system, if the gas liquid separator section is frozen, during power generation of the fuel cell stack, in the circulation circuit of the anode system apparatus, liquid water and the anode off gas containing nitrogen cannot discharged from the drain channel of the gas liquid separator section. In this state, since the anode off gas containing the nitrogen is supplied to the fuel cell stack, the nitrogen concentration in the fuel cell stack is increased, and the hydrogen concentration is decreased. As a result, in the cell stack, the cell voltage is decreased, and in some cases, power generation is stopped.

The present invention has been made taking the above circumstances into account, and an object of the present invention is to provide a fuel cell system and a method of operating the fuel cell system at low temperature in which it is possible to determine freezing or non-freezing of a gas liquid separator section, and if the gas liquid separator section is frozen, discharge an anode off gas suitably.

In order to achieve the above object, according to a first aspect of the present invention, a fuel cell system is provided. The fuel cell system includes a fuel cell stack, a circulation circuit configured to supply an anode gas to the fuel cell stack, and circulate an anode off gas discharged from the fuel cell stack, a gas liquid separator section provided in the circulation circuit and connected to the fuel cell stack, the gas liquid separator section being configured to separate liquid water contained in the anode off gas discharged from the fuel cell stack and discharge the anode off gas together with the liquid water through a drain channel, a purge channel provided in the circulation circuit and configured to discharge the anode off gas, a purge valve configured to open/close the purge channel, and a control unit configured to control operation of the purge valve, wherein the control unit performs a freezing determination process of determining freezing or non-freezing of the gas liquid separator section after start-up of the fuel cell system, and in a case where freezing of the gas liquid separator section is determined, immediately opens the purge valve for predetermined time.

Further, in order to achieve the above object, according to a second aspect of the present invention, a method of operating a fuel cell system at low temperature is provided. The fuel cell system includes a fuel cell stack, a circulation circuit configured to supply an anode gas to the fuel cell stack, and circulate an anode off gas discharged from the fuel cell stack, a gas liquid separator section provided in the circulation circuit, and connected to the fuel cell stack, the gas liquid separator section being configured to separate liquid water contained in the anode off gas discharged from the fuel cell stack and discharge the anode off gas together with the liquid water through a drain channel, a purge channel provided in the circulation circuit and configured to discharge the anode off gas, and a purge valve configured to open/close the purge channel, the method including a freezing determination process step of determining freezing or non-freezing, after start-up of the fuel cell system, and a freezing confirmation process step of, in the case where freezing of the gas liquid separator section is determined, opening the purge valve immediately for predetermined time.

In the fuel cell system and the method of operating the fuel cell system at low temperature, it is possible to determine freezing or non-freezing of the gas liquid separator section, and if the gas liquid separator section is frozen, discharge the anode off gas suitably.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a flow chart showing an example of a freezing determination process in a method of operating the fuel cell system at low temperature;

FIG. 5 is a flow chart showing an example of a freezing confirmation process in the method of operating the fuel cell system at low temperature; and FIG. 6 is a flow chart showing an example of a defrosting determination process in the method of operating the fuel cell system at low temperature.

DESCRIPTION OF THE PREFERRED EMBODIMENTS

Hereinafter, a preferred embodiment of the present invention will be described with reference to the accompanying drawings.

Figure 1:
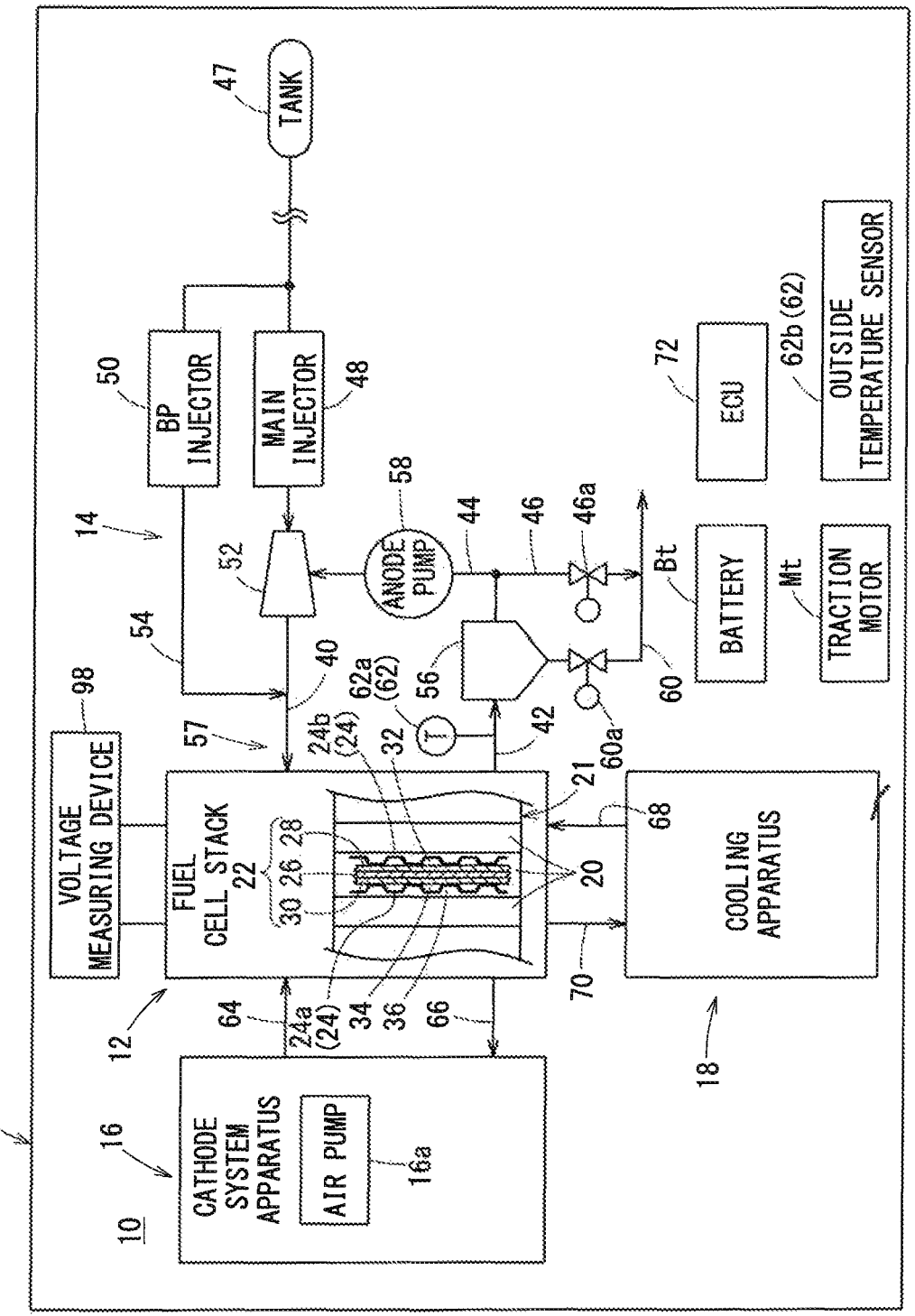
FIG. 1 is a diagram showing overall structure of a fuel cell system according to an embodiment of the present invention.

As shown in FIG. 1, a fuel cell system 10 according to an embodiment of the present invention includes a fuel cell stack 12, an anode system apparatus 14, a cathode system apparatus 16, and a cooling apparatus 18. The fuel cell system 10 is mounted in a motor room of a fuel cell vehicle 11 (fuel cell automobile, hereinafter simply referred to as the vehicle 11), and supplies electrical energy generated in power generation of the fuel cell stack 12 to a battery Bt, a traction motor Mt, etc. to enable travel of the vehicle 11.

The fuel cell stack 12 includes a plurality of power generation cells 20 for performing power generation by electrical chemical reactions of an anode gas (fuel gas such as hydrogen) and a cathode gas (oxygen-containing gas such as the air). In the state where the fuel cell stack 12 is mounted in the vehicle 11, a plurality of power generation cells 20 are stacked together in a vehicle width direction in a manner that electrode surfaces are oriented upright to form a stack body 21. It should be noted the plurality of power generation cells 20 may be stacked together in the vehicle length direction (front/rear direction) of the vehicle 11 or in the gravity direction.

Each of the power generation cells 20 includes a membrane electrode assembly 22 (hereinafter referred to as the "MEA 22"), and a pair of separators 24 (first and second separators 24a, 24b) sandwiching the MEA 22. The MEA 22 includes an electrolyte membrane 26 (e.g., solid polymer electrolyte membrane (cation ion exchange membrane), an anode 28 provided on one surface of the electrolyte membrane 26, and a cathode 30 provided on the other surface of the electrolyte membrane 26. An anode gas flow field 32 as a passage of an anode gas, and a cathode gas flow field 34 as a passage of a cathode gas are formed in surfaces of the first and second separators 24a, 24b facing the MEA 22. Further, when a plurality of power generation cells 20 are stacked together, a coolant flow field 36 as a passage of a coolant is formed between surfaces of the first and second separators 24a, 24b, facing each other.

Further, the fuel cell stack 12 includes a plurality of fluid passages (an anode gas passage, a cathode gas passage, and a coolant passage) (not shown) for allowing the anode gas, the cathode gas, and the coolant to flow through the stack body 21 in the stacking direction of the stack body 21. The anode gas passage is connected to the anode gas flow field 32, the cathode gas passage is connected to the cathode gas flow field 34, and the coolant passage is connected to the coolant flow field 36, respectively.

The anode system apparatus 14 supplies the anode gas to the fuel cell stack 12. In the fuel cell stack 12, the anode gas flows through the anode gas passage (anode gas supply passage), into the anode gas flow field 32, and the anode gas is used in power generation at the anode 28. The anode gas used in power generation (containing the unreacted hydrogen) referred to as the anode off gas flows from the anode gas flow field 32 to the anode gas passage (anode gas discharge passage), and is discharged from the fuel cell stack 12 into the anode system apparatus 14. Further, in the fuel cell stack 12, the cathode gas containing the hydrogen which flowed into the cathode gas flow field 34 permeates through the electrolyte membrane 26 (cross leakage of the cathode gas occurs). As a result, the nitrogen gas flows into the anode gas flow field 32. That is, the anode off gas discharged from the fuel cell stack 12 contains the unreacted hydrogen gas and the nitrogen gas.

Further, the cathode system apparatus 16 supplies the cathode gas to the fuel cell stack 12. In the fuel cell stack 12, the cathode gas flows through the cathode gas passage (cathode gas supply passage), flows into the cathode gas flow field 34, and the cathode gas is used in power generation at the cathode 30. The cathode gas used in power generation referred to as the cathode off gas flows from the cathode gas flow field 34 to the cathode gas passage (cathode gas discharge passage), and is discharged from the fuel cell stack 12 into the cathode system apparatus 16.

Further, the cooling apparatus 18 supplies the coolant to the fuel cell stack 12. In the fuel cell stack 12, the coolant flows through the coolant passage (coolant supply passage), and flows into the coolant flow field 36 for cooling the power generation cells 20. The coolant which cooled the power generation cells 20 flows from the coolant flow field 36 into the coolant passage (coolant discharge passage), and the coolant is discharged from the fuel cell stack 12 into the cooling apparatus 18.

Further, the fuel cell stack 12 according to the embodiment of the present invention accommodates the stack body 21 in the stack case. Terminal plates (not shown) are provided at both ends of the stack body 21 in the stacking direction. Insulating plates are provided outside the terminal plates, and end plates are provided outside the insulating plates. The end plates apply a tightening load to the power generation cells 20, in the stacking direction of the power generation cells 20.

The anode system apparatus 14 of the fuel cell system 10 includes an anode supply channel 40 for supplying the anode gas to the fuel cell stack 12, and an anode discharge channel 42 for discharging the anode off gas from the fuel cell stack 12. Further, an anode circulation channel 44 for returning the anode off gas in the anode discharge channel 42 to the anode supply channel 40 is connected between the anode supply channel 40 and the anode discharge channel 42. A purge channel 46 is connected to the anode circulation channel 44, for discharging the anode off gas from a circulation circuit 57 of the anode system apparatus 14.

A tank 47 storing an anode gas (high pressure hydrogen gas) is connected to one end (upstream end) of the anode supply channel 40. The tank 47 discharges the anode gas to the anode supply channel 40 based on opening/closing of in-tank solenoid valve (not shown).

Further, the anode supply channel 40 of the anode system apparatus 14 is provided with a main injector 48 for regulating the flow rate of the anode gas supplied to the fuel cell stack 12. The main injector 48 is chiefly used during operation of the fuel cell system 10, and opened/closed in a manner that the anode gas on the upstream side (high pressure side) of the anode supply channel 40 has a predetermined pressure, to an inject the anode gas toward the downstream side (low pressure side).

An ejector 52 is provided on the downside stream side of the main injector 48 of the anode supply channel 40. The ejector 52 sucks the anode off gas from the anode circulation channel 44, and supplies the anode gas to the fuel cell stack 12 on the downstream side, by the negative pressure generated by movement of the anode off gas injected from the main injector 48.

Further, a supply bypass channel 54 bypassing the main injector 48 and the ejector 52 is connected to the anode supply channel 40. The supply bypass channel 54 is provided with a BP (bypass) injector 50. For example, when high load power generation of the fuel cell stack 12 is required, the BP injector 50 is opened/closed in a manner that the anode gas on the upstream side of the supply bypass channel 54 (high pressure side) has a predetermined pressure on the downstream side (low pressure side), to increase the pressure of the anode gas to reach a value required for the high load power generation. As a result, the anode system apparatus 14 supplies the high concentration hydrogen to the fuel cell stack 12 during high load power generation.

Further, a gas liquid separator 56 (gas liquid separator section) is provided between the anode discharge channel 42 and the anode circulating channel 44, for separating the liquid contained in the anode off gas (water produced during power generation) from the gas (hydrogen gas, nitrogen gas, etc.). That is, in the anode system apparatus 14, the circulation circuit 57 is formed by the fuel cell stack 12, the ejector 52, the anode supply channel 40 on the downstream side of the ejector 52, the anode discharge channel 42, the gas liquid separator 56, and the anode circulation channel 44.

The anode circulation channel 44 is connected to an upper part of the gas liquid separator 56, and discharges the anode off gas after separation of the liquid water. The anode circulation channel 44 is provided with an anode pump 58 for circulating anode off gas to the anode supply channel 40. It should be noted that the anode pump 58 may be dispensed with.

Further, one end of a drain channel 60 for discharging the separated liquid water is connected to the bottom of the gas liquid separator 56. The drain channel 60 is provided with a drain valve 60*a* for opening/closing the channel. Further, the purge channel 46 is connected to the drain channel 60, and a purge valve 46*a* is provided along the purge channel 46 for opening/closing the channel.

Further, the fuel cell system 10 includes a temperature sensor 62 for detecting the temperature of the surrounding environment. The temperature sensors 62 includes an anode outlet temperature sensor 62*a* provided in the anode discharge channel 42 for detecting the temperature of the anode off gas, and an outside temperature sensor 62*b* for detecting the outside temperature of the vehicle 11.

On the other hand, the cathode system apparatus 16 of the fuel cell system 10 includes a cathode supply channel 64 for supplying the cathode gas to the fuel cell stack 12, and a cathode discharge channel 66 for discharging the cathode off gas from the fuel cell stack 12. The cathode system apparatus 16 includes an air pump 16*a*, and auxiliary devices (not shown) such as a humidifier, and supplies the cathode gas compressed by the air pump 16*a*, and humidified by the humidifier (not shown), to the fuel cell stack 12. One end of the drain channel 60 of the anode system apparatus 14 is connected to the downstream side of the cathode discharge channel 66. That is, the fuel cell system 10 dilutes the anode off gas by the cathode off gas, and discharges the diluted anode off gas to the outside of the vehicle 11.

Further, the cooling apparatus 18 of the fuel cell system 10 includes a coolant supply channel 68 for supplying the coolant to the fuel cell stack 12, and a coolant discharge channel 70 for discharging the coolant from the fuel cell stack 12 to circulate the coolant between the cooling apparatus 18 and the fuel cell stack 12.

The fuel cell system 10 includes an ECU 72 (Electronic Control Unit: Control Unit) which controls operation of each structure of the fuel cell system 10 to perform power generation of the fuel cell stack 12. The ECU 72 is in the form of a computer (including a microcontroller) having one or more processors, a memory, and an input/output interface.

For example, operation of the ECU 72 is started under control operation of a user (passenger) of the vehicle 11, to start operation of the fuel cell system 10 which has been stopped (hereinafter also referred to as the start-up or start-up operation). After the start-up, the ECU 72 performs the power generation of the fuel cell stack 12 (hereinafter referred to as the power generation during operation), to supply electrical energy generated in the power generation, to the battery Bt and the traction motor Mt. During power generation during operation, the ECU 72 performs, in addition to normal power generation, high load power generation for increasing the power generation amount, and low load power generation for decreasing the power generation amount, etc. based on power generation request instructions of a motor ECU which controls the traction motor MT, and the state of charge (SOC) of the battery Bt. Further, the ECU 72 performs a stop process for stopping power generation of the fuel cell stack 12 (fuel cell system 10) at the time of finishing operation of the vehicle 11.

In this regard, in the fuel cell system 10, in the case where the temperature in the surrounding environment of the vehicle 11 is low (e.g., the freezing temperature or less), the liquid water remaining in the gas liquid separator 56 may be frozen, and the position of the gas liquid separator 56 for discharging the liquid water (including the drain channel 60) may be closed (clogged). In particular, at the time of starting operation of the vehicle 11, since the fuel cell stack 12 and the auxiliary devices are not warmed up sufficiently, it is highly likely that the gas liquid separator 56 is frozen.

Therefore, the ECU 72 according to the embodiment of the present invention performs a freezing determination process of determining freezing or non-freezing of the gas liquid separator 56 at the start-up stage or the initial stage of power generation during operation. Further, in the case where freezing of the gas liquid separator 56 is determined in the freezing determination process, the purge valve 46*a* is opened for predetermined time to discharge the anode off gas from the circulating circuit 57 of the anode system apparatus 14. In the case where the gas liquid separator 56 is not frozen (in the case of non-freezing), the drain valve 60*a* is opened/closed basically, and the purge valve 46*a* is opened/closed in combination, to perform normal power generation during operation.

In particular, in the ECU 72, in the freezing determination process, a determination method in two stages (the first determination process and the second determination process) is used to increase the accuracy of determining freezing or non-freezing of the gas liquid separator 56. The first determination process is a freezing determination process performed at the time of start-up operation of the fuel cell system 10. The second determination process is a freezing determination process performed at the initial stage of the power generation during operation of the fuel cell system 10.

The processor of the ECU 72 execute a program (not shown) stored in a memory to build a function block which performs the freezing determination process and the control at the time of freezing.

Figure 2:
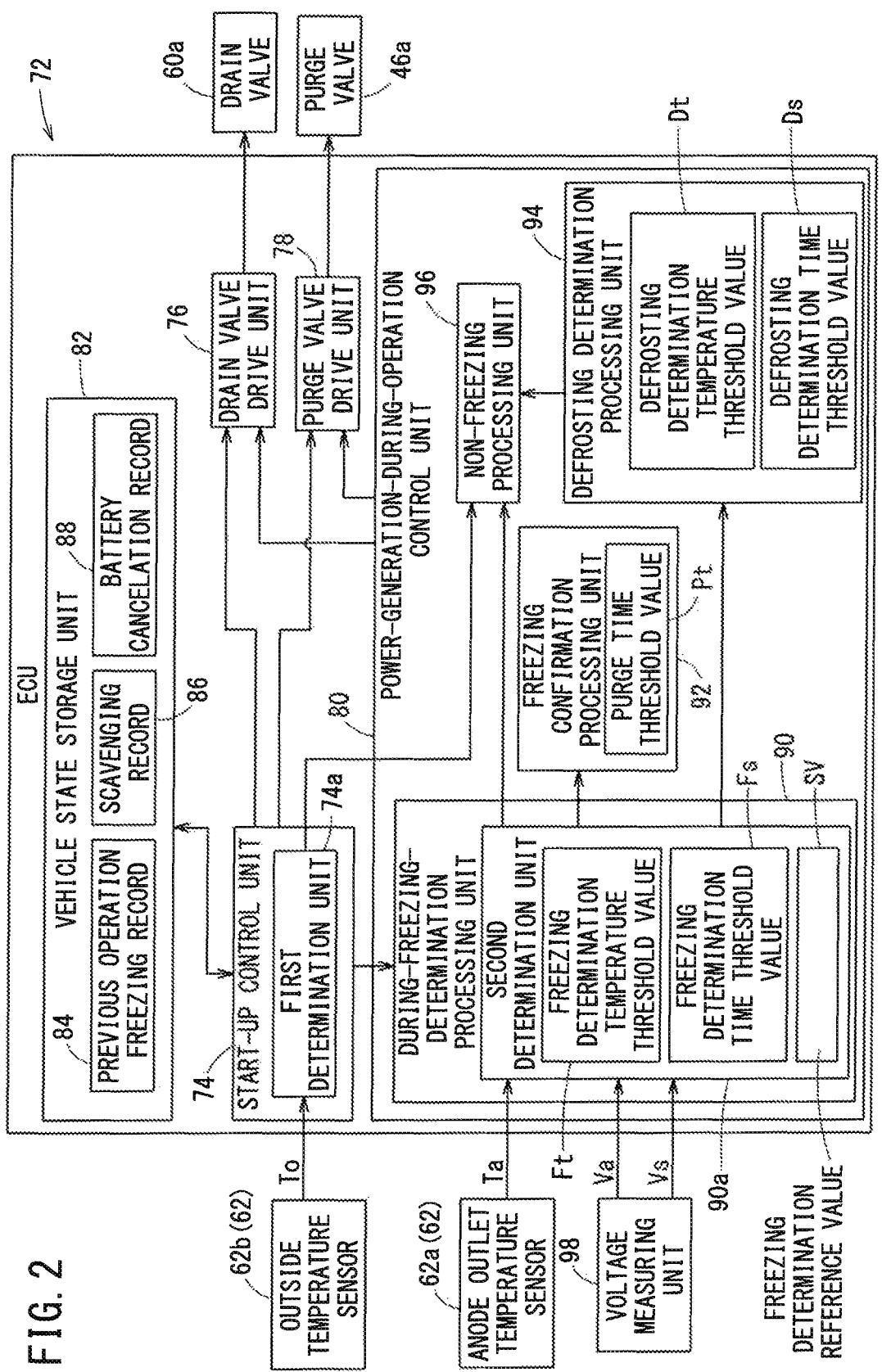
FIG. 2 is a function block diagram showing an ECU of the fuel cell system.

Specifically, as shown in FIG. 2, a start-up control unit 74, a drain valve drive unit 76, a purge valve drive unit 78, and a power-generation-during-operation control unit 80 are provided in the ECU 72. Further, the ECU 72 establishes a vehicle state storage unit 82 for storing information regarding freezing in a predetermined area of the memory.

The start-up control unit 74 controls operation of each structure of the anode system apparatus 14, the cathode system apparatus 16, and the cooling apparatus 18 to enable power generation of the fuel cell stack 12, based on the starting instructions of the vehicle 11 (ON signals of an ignition switch and a starter switch from the user). At the time of start-up, the anode system apparatus 14 opens/closes the main injector 48 and various items of the valves to supply the anode gas to the fuel cell stack 12. At the time of start-up, the cathode system apparatus 16 rotates the air pump 16a (see FIG. 1), and opens/closes various valves to supply the cathode gas to the fuel cell stack 12. Therefore, in the case where the capacity of the battery Bt (not shown) has a constant value or less at the time of start-up, the fuel cell stack 12 performs stand-by power generation (charging) based on the supplied anode gas and the cathode gas. By this standby power generation, the temperature of the fuel cell stack 12 is increased, and the temperature of the auxiliary devices (including the gas liquid separator 56) provided around the fuel cell stack 12 is increased. As a result, warm up operation is performed.

Figure 3:
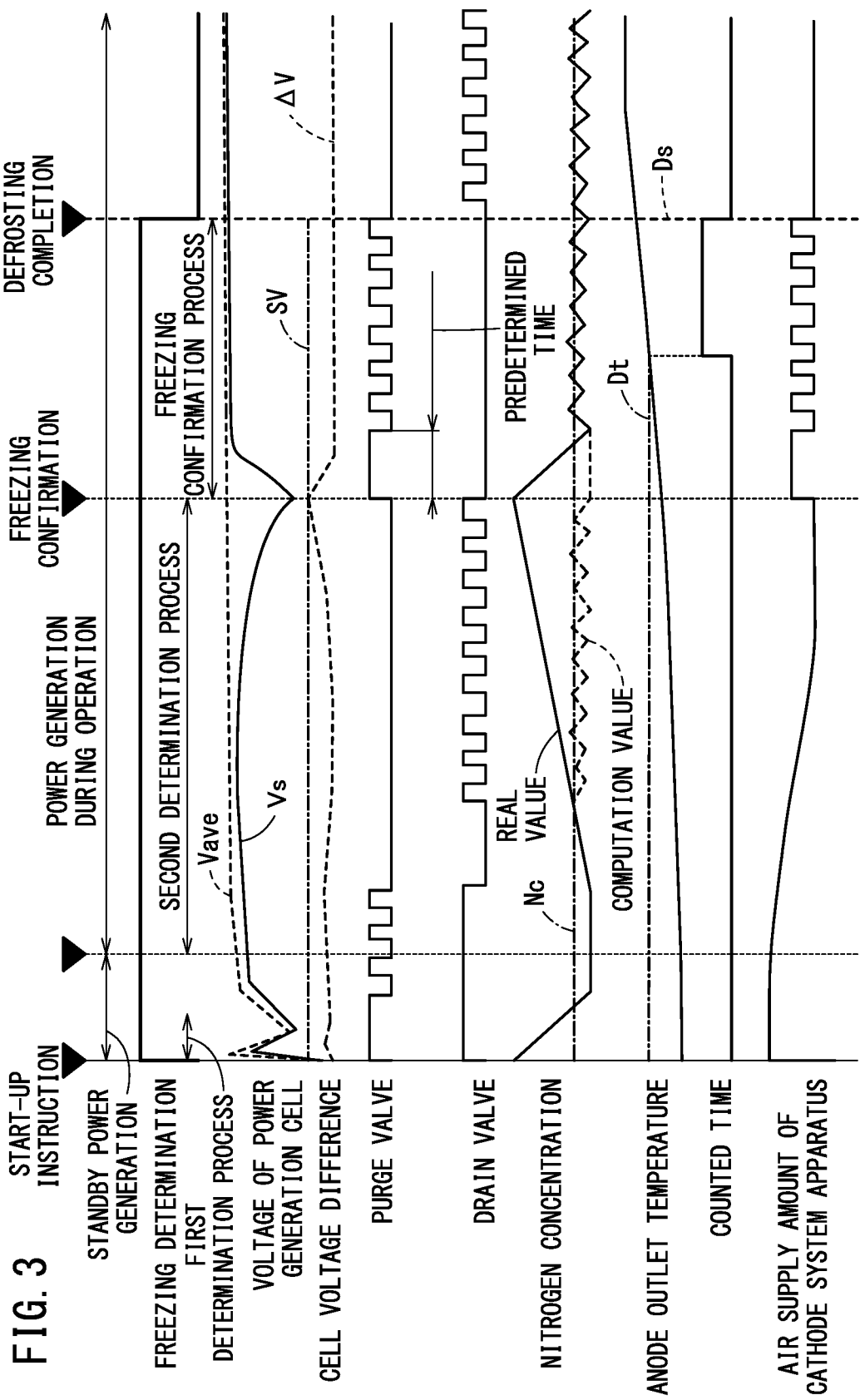
FIG. 3 is a timing chart showing an example of a freezing determination process, a freezing confirmation process, and a defrosting determination process of the fuel cell system.

Further, as shown in FIG. 3, at the initial stage of start-up operation of the vehicle, the start-up control unit 74 basically opens the purge valve 46a and the drain valve 60a intermittently. The purge valve 46a and the drain valve 60a are opened to discharge the nitrogen produced in the stop state (soak state) of the fuel cell system 10 and during the standby power generation. Further, since freezing of the gas liquid separator 56 (and the drain valve 60a positioned below the gas liquid separator 56) has not been confirmed during standby power generation, the anode off gas may be discharged from the drain channel 60. Further, the ECU 72 computes the nitrogen concentration in the circulation circuit 57 in accordance with intermittent opening of the purge valve 46a and the drain valve 60a.

Referring back to FIG. 2, the start-up control unit 74 is provided with a first determination unit 74a, and at the time of start-up operation of the fuel cell system 10, the first determination unit 74a performs the first determination process for determining possibility of whether or not the gas liquid separator 56 has been frozen. The first determination unit 74a determines the possibility of freezing of the gas liquid separator 56 based on where or not any of the following four conditions (a) to (d) has been satisfied.

(a) The surrounding environment of the fuel cell system 10 has a temperature which is not more than a predetermined temperature.
(b) The gas liquid separator 56 was frozen, or there was a possibility of freezing of the gas liquid separator 56 during the previous operation.
(c) A scavenging process of discharging the liquid water in the fuel cell stack 12 was performed during the previous operation.
(d) The battery Bt was removed.

The condition (a) is adopted as a condition of the first determination process, since, when the temperature of the surrounding environment of the fuel cell system 10 is low, freezing of the gas liquid separator 56 occurs. For example, the ECU 72 obtains outer temperature information To of the outside temperature sensor 62b (temperature sensor 62) which detects the outside temperature of the vehicle 11, and determines that the outside temperature is low if the outside temperature information To is lower than a predetermined outside temperature threshold value (not shown). Alternatively, the ECU 72 may make determination based on the current position obtained by a positional measurement system (not shown) of the vehicle 11 and the temperature information in correspondence with the current position obtained from the outside.

The condition (b) is adopted as a condition of the first determination process since in the case where the gas liquid separator 56 was frozen in the previous operation of the fuel cell system 10, there is a possibility of freezing also in the current operation. In this case, the first determination unit 74a determines whether or not the gas liquid separator 56 was frozen in the previous operation with reference to a previous operation freezing record 84 stored in the vehicle state storage unit 82. For example, the previous operation freezing record 84 is stored as information of a flag, and during operation, in the case where the ECU 72 determines freezing of the gas liquid separator 56 or the possibility of freezing of the gas liquid separator 56, the ECU 72 sets the flag to "1", and otherwise, the ECU 72 sets the flag to "0".

The condition (c) is adopted as a condition of the first determination process since, in the case where the scavenging process was performed in the previous operation of the fuel cell system 10, it is predicted that the start-up operation was performed under the low temperature environment. In the scavenging process, at the time of the operation stop process, the cathode gas (or the anode gas) is supplied into the fuel cell stack 12 and/or the gas liquid separator 56 to forcibly discharge the liquid water in the gas liquid separator 56 to the outside for preventing freezing. The first determination unit 74a determines whether or not the scavenging process has been performed with reference to a scavenging record 86 stored in the vehicle state storage unit 82. For example, the scavenging record 86 is stored as information of a flag, and in the case where the scavenging process is performed when operation is stopped, the ECU 72 sets the flag to "1", and in the case where the scavenging process is not performed when operation is stopped, the ECU 72 sets the fag to "0".

The condition (d) is adopted as a condition of the first determination process. This condition is satisfied in the case where there is a battery cancellation record 88. It is because, when the battery Bt is removed from the vehicle 11, e.g., in maintenance operation, etc. of the vehicle 11, the previous operation freezing record 84 and/or the scavenging record 86 are deleted. For example, the battery cancellation record 88 is stored as information of a flag. It is adequate that the ECU 72 sets the flag to "1" in response to restoration of the power supply by reattachment of the battery Bt, and sets the flag to "0" in the case where various items of records are stored.

The first determination unit 74a checks the above conditions (a) to (d) at the time of start-up operation of the fuel cell system 10, and in the case where any one of the conditions is satisfied, the first determination unit 74a determines that there is a possibility of freezing of the gas liquid separator 56, and in the case where none of the conditions (a) to (d) are satisfied, the first determination unit 74a determines that there is no possibility of freezing of the gas liquid separator 56. If any one of the conditions (a) to (d) is satisfied, it can be said there is at least a little possibility of freezing of the gas liquid separator 56. By considering all of the condition (a) to (d), it is possible to significantly decrease the possibility of determining non-freezing of the gas liquid separator 56 even though freezing of the gas liquid separator 56 occurs at the time of start-up operation of the fuel cell system 10. It should be noted that the timing of performing the first determination process is not limited specially as long as the second determination process described later has not yet been performed. The first determination process may be performed immediately after the start-up operation, and may be performed immediately before the end of the stand-by power generation, or at the initial stage of the power generation during operation.

On the other hand, the drain valve drive unit 76 controls the operating state (opening/closing) of the drain valve 60*a* based on operation instructions of the start-up control unit 74 and/or the power-generation-during-operation control unit 80. Likewise, the purge valve drive unit 78 controls the operating state (opening/closing) of the purge valve 46*a* based on operation instructions of the start-up control unit 74 and/or the power-generation-during-operation control unit 80.

The power-generation-during-operation control unit 80 is a function unit which controls power generation during operation of the fuel cell system 10, when a travel permission is given to the vehicle 11 after start-up operation (standby power generation) of the fuel cell system 10. Further, in the case where the power-generation-during-operation control unit 80 determines the possibility of the gas liquid separator 56 in the above first determination process, the power-generation-during-operation control unit 80 additionally performs the second determination process of determining freezing or non-freezing of the gas liquid separator 56. To this end, in the power-generation-during-operation control unit 80, a processing unit 90 for performing the process during determination of freezing (hereinafter referred to as the during-freezing-determination processing unit 90), a freezing confirmation processing unit 92, a defrosting determination processing unit 94, and a non-freezing processing unit 96 are provided.

In the case where the first determination unit 74*a* determines that there is a possibility of freezing of the gas liquid separator 56, the during-freezing-determination processing unit 90 controls operation of each structure of the fuel cell system 10 during the determination period until freezing of the gas liquid separator 56 is determined in the second determination process. As shown in FIG. 3, during this determination period, the during-freezing-determination processing unit 90 opens/closes the purge valve 46*a* and the drain valve 60*a*, as in the case of normal power generation during operation. In the example of FIG. 3, the purge valve 46*a* is temporality closed, and the drain valve 60*a* is operated (opened/closed). It is because it is premature to consider that the gas liquid separator 56 is frozen during this determination period. It should be noted that, in the determination period, the during-freezing-determination processing unit 90 may perform control which is different from normal power generation during operation (e.g., repeat opening/closing of the purge valve 46*a*).

Further, the ECU 72 computes the nitrogen concentration in the circulation circuit 57 based on the open/close state of the purge valve 46*a* and the drain valve 60*a*. At this time, the during-freezing-determination processing unit 90 measures the nitrogen concentration of the purge valve 46*a* and/or the drain valve 60*a*, and intermittently open the drain valve 60*a* when the nitrogen concentration exceeds a concentration threshold value Nc (see FIG. 3). It should be noted that in the case where the gas liquid separator 56 is frozen, even though an operating instruction to operate the drain value 60*a* is issued, the drain valve 60*a* is not opened. Therefore, the real value of the nitrogen concentration increases, and deviates from the computation value.

Referring back to FIG. 2, a second determination unit 90*a* of the during-freezing-determination processing unit 90 performs the second determination process of determining freezing or non-freezing inside the gas liquid separator 56. In the second determination process, the second determination unit 90*a* determines freezing or non-freezing of the gas liquid separator 56 based on the cell voltage of the fuel cell stack 12 (the plurality of power generation cells 20). To this end, the fuel cell system 10 includes a voltage measuring unit 98 for measuring the voltage of the power generation cells 20. The voltage measuring unit 98 detects the cell overall voltage Va as the voltage of the stack body 21 (the plurality of power generation cells 20 as a whole), detects the cell voltage Vs of the power generation cell 20 having the lowest voltage among the plurality of power generation cells 20 of the stack body 21, and transmits each of detection values to the ECU 72.

In the second determination process, the second determination unit 90*a* divides the cell overall voltage Va of the gas liquid separator 56 by the number of the power generation cells 20 of the stack body 21 to calculate the voltage (cell average voltage Vave) per unit power generation cell (see FIG. 3). Further, the second determination unit 90*a* subtracts cell voltage Vs from the cell average voltage Vave to calculate the cell voltage difference ΔV.

In this regard, during power generation, the stack body 21 of the fuel cell stack 12 tends to have the lowest temperature at end cells. The state where the cell voltage Vs of the power generation cell 20 having the lowest voltage is significantly different from the cell average voltage Vave indicates that, since any of the power generation cells 20 of the stack body 21 is frozen, the power generation voltage of the power generation cell 20 is decreased. Therefore, in the case where the cell voltage difference ΔV becomes large over time, it can be considered that any of the power generation cells 20 is frozen. It can be naturally considered that the gas liquid separator 56 disposed adjacent to the outside of the fuel cell stack 12 is frozen as well. Therefore, the second determination unit 90*a* has a predetermined freezing determination reference value SV, and in the case where the calculated cell voltage difference ΔV becomes not less than the freezing determination reference value SV, the second determination unit 90*a* determines freezing of the gas liquid separator 56.

Further, as shown in FIGS. 2 and 3, the second determination unit 90*a* determines freezing or non-freezing of the gas liquid separator 56 based on the anode off gas temperature information Ta of the anode outlet temperature sensor 62*a* and the determination period. Specifically, the second determination unit 90*a* has a freezing determination temperature threshold value Ft and a freezing determination time threshold value Fs. Further, in the case where the value of the anode off gas temperature information Ta is below the freezing determination temperature threshold value Ft within the period of the freezing determination time threshold value Fs, the second determination unit 90*a* continues to compare the freezing determination reference value SV and the voltage difference ΔV.

On the other hand, in the case where the value of the anode off gas temperature information Ta is not less than the freezing determination temperature threshold value Ft or the counted time of the second determination process is not less than the freezing determination time threshold value Fs, the second determination unit 90a determines non-freezing of the gas liquid separator 56 (including the case where the gas liquid separator 56 was frozen, and then, defrosted). In the case where the value of the anode off gas temperature information Ta becomes not less than the freezing determination temperature threshold value Ft or the counted time becomes not less than the freezing determination time threshold value Fs, it can be considered that warm up operation of the gas liquid separator 56 has been performed sufficiently.

Further, the freezing confirmation processing unit 92 of the power-generation-during-operation control unit 80 is a function unit which performs a process of decreasing the nitrogen concentration of the circulation circuit 57, in the case where the second determination unit 90a determines (confirms) freezing of the gas liquid separator 56. The freezing confirmation processing unit 92 forcibly opens the purge valve 46a for predetermined time to discharge the anode off gas containing the nitrogen gas from the circulation circuit 57. Therefore, the freezing confirmation processing unit 92 has a purge time threshold value Pt which defines a period in which the purge valve 46a is opened, and after confirmation of freezing, counts the forcible open time period of the purge valve 46a. In the case where the counted time exceeds the purge time threshold value Pt, the freezing confirmation processing unit 92 finishes the forcible opening.

The purge time threshold value Pt may be determined as necessary to have a desired value regarding the replacement ratio (in the range between 0 and 100%) at which the nitrogen gas in the circulation circuit 57 is replaced with the anode gas. In the fuel cell system 10 according to the embodiment of the present invention, by determining the purge time threshold value Pt so that substantially 100% of the nitrogen gas can be replaced, it is possible to discharge the anode off gas until the nitrogen gas of the circulation circuit 57 is replaced with the hydrogen gas completely. It should be noted that the replacement state (purge time threshold value Pt) in the nitrogen concentration of the circulation circuit 57 may be determined based on computation of the nitrogen concentration or the time based on the pressure of the circulation circuit 57 and the minimum discharging diameter of the purge valve 46a through which the nitrogen is discharged. Further, the replacement state of the nitrogen concentration of the circulation circuit 57 may be determined based on the restoration amount of the decreased cell voltage Vs. The predetermined time (purge time threshold value Pt) in which the purge valve 46a is opened continuously may be determined by the time required for the nitrogen concentration to substantially match the concentration threshold Nc by opening the purge valve 46a or the time required for the cell voltage Vs to substantially match the cell average voltage Vave.

Further, even after the counted time exceeds the purge time threshold value Pt and the forcible opening of the purge valve 46a is finished, the freezing confirmation processing unit 92 opens/closes the purge valve 46a until defrosting of the gas liquid separator 56 is determined. In this manner, stability of the nitrogen concentration is achieved in the circulation circuit 57. In this regard, as in the case of the control by the during-freezing-determination processing unit 90, in the case where the computation value of the nitrogen concentration exceeds a concentration threshold value Nc, it is adequate that the freezing confirmation processing unit 92 repeats the process of opening the purge valve 46a for predetermined time.

It is adequate that, in the process of freezing confirmation, the freezing confirmation processing unit 92 performs the control to increase the supply amount of the cathode gas (discharge amount of the cathode gas or the cathode off gas) of the cathode system apparatus 16. The purge channel 46 and the drain channel 60 are coupled to the cathode discharge channel 66 of the cathode system apparatus 16, and it is possible to facilitate dilution of the anode off gas discharged from the purge channel 46 by the increased cathode gas. For example, after confirmation of freezing, the freezing confirmation processing unit 92 immediately opens the purge valve 46a for predetermined time, and after elapse of the predetermined time, opens the purge valve 46a intermittently. In this regard, the rotation speed of the air pump 16a of the cathode system apparatus 16 is increased in correspondence with the valve opening of the purge valve 46a.

The defrosting determination processing unit 94 of the power-generation-during-operation control unit 80 is a function unit for determining defrosting of the gas liquid separator 56 after determining freezing of the gas liquid separator 56. The defrosting determination processing unit 94 makes determination regarding defrosting of the gas liquid separator 56 based on the anode off gas temperature information Ta of the anode outlet temperature sensor 62a and the elapsed time. The defrosting determination processing unit 94 has a defrosting determination temperature threshold value Dt for comparison with the anode off gas temperature information Ta, and a defrosting determination time threshold value Ds for comparison with the elapsed time.

It should be noted that the defrosting determination of the gas liquid separator 56 by the defrosting determination processing unit 94 may be determined by computing the received heat quantity from the fuel cell stack 12 to the auxiliary devices (gas liquid separator 56), and using the computed received heat quantity (defrosting energy). Further, defrosting of the gas liquid separator 56 need not be necessarily determined using the anode off gas temperature information Ta. Temperature information of another temperature sensor 62 may be used to determine defrosting of the gas liquid separator 56.

On the other hand, the non-freezing processing unit 96 of the power-generation-during-operation control unit 80 is a function unit which performs its process in the case where the second determination unit 90a determines non-freezing of the gas liquid separator 56. Preferably, the non-freezing processing unit 96 performs the same control as the control in the normal power generation of the power-generation-during-operation control unit 80. For example, the anode off gas (nitrogen gas) in the circulation circuit 57 is discharged by repeating opening/closing of the drain valve 60a.

The fuel cell system 10 according to the embodiment of the present invention basically has the structure as described above. Hereinafter, operation of the fuel cell system 10 (method of operating the fuel cell system 10 at low temperature) will be described.

The ECU 72 of the fuel cell system 10 starts operation of the fuel cell system 10 based on user's start control operation of the vehicle 11, and performs power generation during operation after the start-up operation. At the time of start-up, the ECU 72 (start-up control unit 74) controls the anode system apparatus 14, the cathode system apparatus 16, and the cooling apparatus 18 to perform standby power generation of the fuel cell stack 12. When the vehicle 11 is placed in the state where the vehicle 11 can travel, the ECU 72 (power-generation-during-operation control unit 80) performs power generation during operation based on a power generation request instruction of the motor ECU, etc.

Further, after the start-up, the ECU 72 performs the freezing determination process (freezing determination process step) of determining freezing or non-freezing of the gas liquid separator 56. Further, in the case where freezing of the gas liquid separator 56 is determined, the ECU 72 performs the process of switching the normal control of opening/closing the purge valve 46a and the drain valve 60a to the control in correspondence with freezing. Specifically, as shown in FIG. 4, in the freezing determination process, after start-up operation of the fuel cell system 10, in the middle of performing the standby operation, the first determination unit 74a determines whether or not the conditions (a) to (d) regarding the possibility of freezing of the gas liquid separator 56 in the first determination process are satisfied or not (step S1). Then, in the first determination process, if none of the conditions (a) to (d) (step S1: NO) are satisfied, the routine proceeds to step S2.

In the case where non-freezing is determined in first determination process, it is possible to determine (confirm) that there is no possibility of freezing of the gas liquid separator 56, i.e., it is possible to determine that the gas liquid separator 56 is not frozen even in comprehensive determination based on various conditions in light of different perspectives. Therefore, in step S2, the first determination unit 74a stores information of non-freezing of the gas liquid separator 56 (where, e.g., the previous operation freezing record 84 is 0) in the vehicle state storage unit 82. Then, after the startup control unit 74 continues the standby power generation and then, finishes the standby power generation, the ECU 72 performs normal control in power generation during operation by the power-generation-during-operation control unit 80 (non-freezing processing unit 96).

On the other hand, if any one of the conditions (a) to (d) is satisfied (step S1: YES) in the first determination process, the routine proceeds to step S3. In this case, there is a possibility that the gas liquid separator 56 is frozen. However, determination of the freezing in the first determination process does not mean confirmation of freezing of the gas liquid separator 56, and there is a possibility that the gas liquid separator 56 is not frozen, or a possibility that the gas liquid separator 56 is frozen but can be defrosted by performing standby power generation. Therefore, the startup control unit 74 continues the standby power generation, and determines whether or not the standby power generation has been finished in step S3. In the case where the standby power generation has not been finished (step S3: NO), step S3 is repeated. In the case where the standby power generation has been finished (step S3: YES), the routine proceeds to step S4.

After finishing the standby power generation (after permitting travel of the vehicle 11), while determination of the possibility of freezing is still effective, the ECU 72 shifts its operation to the power generation during operation by the power-generation-during-operation control unit 80, and counts time from the start of power generation during operation. On the other hand, in step S4, the second determination unit 90a monitors the determination period in the second determination process and the temperature of the gas liquid separator 56, to determine freezing or non-freezing of the gas liquid separator 56. Specifically, the second determination unit 90a determines whether or not the value of the anode off gas temperature information Ta is lower than the freezing determination temperature threshold value Ft, and the counted time has not reached the freezing determination time threshold value Fs (whether the counted time is shorter than the freezing determination time threshold value Fs). Then, in the case where the result of step S4 is YES (true), the routine proceeds to step S5, and in the case where the result of step S4 is NO (false), the routine proceeds to step S8.

In step S5, the during-freezing-determination processing unit 90 determines whether or not the power generation during operation continues. That is, in the fuel cell system 10, during the determination period of power generation during operation, there is a possibility that power generation stops for some reasons, e.g., due to stop of operation of the vehicle 11. The during-freezing-determination processing unit 90 anticipates such a situation, and monitors the state in which power generation during operation is performed. Then, in the case where the result of step S5 is YES, the routine proceeds to step S6. On the other hand, in the case where the result of step S5 is NO, the routine proceeds to step S9.

In step S6, the second determination unit 90a compares the cell voltage difference $\Delta V$ calculated based on the cell overall voltage Va and the cell voltage Vs, with the freezing determination reference value SV, and determines whether or not the cell voltage difference $\Delta V$ becomes not less than the freezing determination reference value SV. As described above, in the case where the cell voltage difference $\Delta V$ is not less than the freezing determination reference value SV (step S6: YES), it is possible to consider that the gas liquid separator 56 is frozen. Therefore, the routine proceeds to step S7, and the second determination unit 90a determines (confirms) freezing of the gas liquid separator 56, and stores information regarding freezing (e.g., previous operation freezing record 84) in the vehicle state storage unit 82. Then, the power-generation-during-operation control unit 80 shifts its operation to the freezing confirmation process at the time of determining (confirming) freezing of the gas liquid separator 56.

On the other hand, in the case where the cell voltage difference $\Delta V$ is lower than the freezing determination reference value SV (step S6: NO), the routine returns to step S4 to repeat the subsequent steps. In this process flow, in the case where the anode off gas temperature information Ta becomes not less than the freezing determination temperature threshold value Ft, or in the case where the counted time reaches the freezing determination time threshold value Fs, non-freezing of the gas liquid separator 56 is determined (there is no possibility of freezing). Therefore, in step S8, the second determination unit 90a stores information of non-freezing of the gas liquid separator 56 (e.g., the previous operation freezing record 84 is 0) in the vehicle state storage unit 82. Then, the ECU 72 shifts its operation to power generation during operation (normal control) by the non-freezing processing unit 96.

Further, in the case where non-performance (stop) of power generation during operation is determined in step S5 (step S5: NO), the power-generation-during-operation control unit 80 stores information indicating that there is a possibility of freezing of the gas liquid separator 56 (e.g., where the previous operating freezing record 84 is 1) in the vehicle state storage unit 82 (step S9). In this manner, when operation of the fuel cell system 10 is started, information indicating the possibility of freezing (pervious operation freezing record 84) is retained, and it becomes possible to determine freezing of the gas liquid separator 56 again.

Next, the process of decreasing the nitrogen concentration at the time of determining freezing confirmation will be described with reference to FIG. 5. The freezing confirmation processing unit 92 of the power-generation-during-operation control unit 80 is performed based on determination of freezing of the above second determination unit 90a. The freezing confirmation processing unit 92 forcibly opens the purge valve 46a in response to freezing confirmation (step S11), or counts the open time period of the purge valve 46a. By forcibly opening the purge valve 46a, the circulation circuit 57 of the anode system apparatus 14 discharges the anode off gas containing the nitrogen gas through the purge channel 46.

Then, the freezing confirmation processing unit 92 determines whether or not the counted time at the time of opening the purge valve 46a is not less than the purge time threshold value Pt (step S12). In the case where the counted time has not reached the purge time threshold value Pt (step S12: NO), the routine returns to S11 to continue opening the purge valve 46a. On the other hand, in the case where the counted time has reached the purge time threshold value Pt (step S12: YES), the routine proceeds to step S13.

In the case where the counted time has reached the purge time threshold value Pt, the nitrogen gas in the circulation circuit 57 has been substantially replaced with the hydrogen gas. Therefore, in step S13, the freezing confirmation processing unit 92 closes the purge value 46a and finishes forcible opening of the purge valve 46a.

Thereafter, while the operation of the drain valve 60a is stopped, the freezing confirmation processing unit 92 opens/closes (operates) the purge valve 46a to perform the control of discharging the anode off gas from the circulation circuit 57 (step S14). Therefore, even after the forcible opening, it is possible to avoid increase of the nitrogen concentration in the circulation circuit 57.

Further, the defrosting determination process of determining defrosting of the gas liquid separator 56 in the freezing confirmation process will be described with reference to FIG. 6. That is, the defrosting determination processing unit 94 of the power-generation-during-operation control unit 80 is operated after determination of freezing of the second determination unit 90a, to monitor the parameters related to the state of the gas liquid separator 56, and determine the defrosting timing of the gas liquid separator 56.

Specifically, the defrosting determination processing unit 94 determines whether or not the anode off gas temperature information Ta of the anode outlet temperature sensor 62a becomes not less than the defrosting determination temperature threshold value Dt (step S21). Further, in the case where the anode off gas temperature information Ta is lower than the defrosting determination temperature threshold value Dt (step S21: NO), the process of step S21 is repeated. On the other hand, in the case where the anode off gas temperature information Ta becomes not less than the defrosting determination temperature threshold value Dt (step S21: YES), the routine proceeds to step S22.

Even after the anode off gas temperature information Ta becomes not less than the defrosting determination temperature threshold value Dt, the defrosting determination processing unit 94 does not determine defrosting of the gas liquid separator 56 immediately, and perform the time counting in step S22. It is because the temperature of the fuel cell stack 12 may be lowered again depending on the surrounding environment of the vehicle 11 and the power generation state of the fuel cell stack 12, and thus, the gas liquid separator 56 may be defrosted insufficiently.

Then, the defrosting determination processing unit 94 determines whether or not the counted time becomes not less than the defrosting determination time threshold value Ds (step S23). In the case where the counted time is less than the defrosting determination time threshold value Ds (step S23: NO), the routine returns to step S21 to repeat the same process. In the case where the counted time reaches the defrosting determination time threshold value Ds (step S23: YES), the routine proceeds to step S24.

In the case where the counted time reaches the defrosting determination time threshold value Ds, it can be said that the liquid water in the gas liquid separator 56 is defrosted reliably, and the liquid water can be discharged from the gas liquid separator 56. For example, even if the cell voltage difference $\Delta V$ is still high, if the counted time exceeds the purge time threshold value Pt, it is possible to consider that the gas liquid separator 56 has been defrosted sufficiently. Therefore, in step S24, the defrosting determination processing unit 94 determines defrosting of the gas liquid separator 56, and stores the information in a vehicle state storage unit 82.

Further, the power-generation-during-operation control unit 80 stops the freezing confirmation process to shift its operation to normal control of power generation during operation by the non-freezing processing unit 96 (step S25). In this regard, in the case where the alternative control for discharging the anode off gas is implemented by opening/closing of the purge valve 46a, the control is switched to the discharge control where operation of the drain valve 60a is performed mainly.

It should be noted that the present invention is not limited to the above described embodiments. It is a matter of course that various modifications may be made in line with the gist of the present invention. For example, the fuel cell system 10 performs one of the first determination process and the second determination process to determine freezing of the gas liquid separator 56 and forcibly open the purge valve 46a.

Further, it is adequate that the ECU 72 determines at least one of the four conditions (a) to (d) in the first determination process. Further, in the first determination process, not only the temperature of the surrounding environment of the vehicle 11 but also the possibility of freezing of the gas liquid separator 56 may be determined based on other temperatures. For example, the fuel cell system 10 may have an internal temperature sensor (not shown) for detecting the temperature inside the gas liquid separator 56 to directly detect the temperature of the liquid water.

Further, in the freezing determination process and/or the defrosting determination process, the fuel cell system 10 may monitor not only both of the anode off gas temperature information Ta and the counted time but also one of the anode off gas temperature information Ta and the counted time to determine freezing (or non-freezing), and defrosting of the gas liquid separator 56.

The technical concepts and advantages that can be understood from the above embodiment will be described below.

According to a first aspect of the present invention, the fuel cell system 10 is provided. The fuel cell system 10 includes the fuel cell stack 12, and the circulation circuit 57 configured to supply an anode gas to the fuel cell stack 12, and circulate an anode off gas discharged from the fuel cell stack 12, the gas liquid separator section (gas liquid separator 56) provided in the circulation circuit 57 and connected to the fuel cell stack 12, the gas liquid separator section (gas liquid separator 56) being configured to separate water contained in the anode off gas discharged from the fuel cell stack 12 and discharge the anode off gas together with the water through the drain channel 60, the purge channel 46 provided in the circulation circuit 57, and configured to discharge the anode off gas, the purge valve 46a configured to open/close the purge channel 46, and the control unit (ECU 72) configured to control operation of the purge valve 46a, wherein the control unit performs a freezing determination process of determining freezing or non-freezing of the gas liquid separator section after start-up of the fuel cell system 10, and in the case where freezing of the gas liquid separator section is determined, the control unit immediately opens the purge valve 46a for predetermined time.

In the fuel cell system 10, in the case where the freezing determination process is performed after the start-up to determine freezing of the gas liquid separator section (gas liquid separator 56), the purge valve 46a is opened immediately for predetermined time. In this manner, it is possible to suitably discharge the nitrogen contained in the anode off gas. Accordingly, in the fuel cell system 10, the nitrogen concentration of the circulation circuit 57 is decreased, and it is possible to avoid shortage of supply of the anode gas to the fuel cell stack 12, and it becomes possible to suppress the decrease of the power generation efficiency and/or stop of power generation. Further, in the fuel cell system 10, by determining non-freezing of the gas liquid separator section in the freezing determination process, since it is possible to suppress discharge of the anode off gas by the purge valve 46a, it is possible to suppress significant deterioration of the fuel economy.

Further, the freezing determination process includes a first determination process of determining whether or not there is a possibility of freezing of the gas liquid separator section (gas liquid separator 56), and a second determination process of determining freezing or non-freezing of the gas liquid separator section while continuing power generation of the fuel cell stack 12, in the case where the possibility of freezing of the gas liquid separator section is determined in the first determination process. In this manner, by making determination in two stages (the first determination process and the second determination process), the control unit (ECU 72) can determine freezing or non-freezing of the gas liquid separator section more accurately.

Further, in the first determination process, in the case where any one of the following conditions (a) to (d) are satisfied, the possibility of freezing of the gas liquid separator section (gas liquid separator 56) is determined, and in the case wherein none of the following conditions (a) to (d) is satisfied, non-freezing of the gas liquid separator section is determined.
  (a) The temperature of the surrounding environment of the fuel cell system 10 is not more than a predetermined temperature.
  (b) During the previous operation, the gas liquid separator section was frozen or there was a possibility of freezing of the gas liquid separator section.
  (c) A scavenging process of discharging liquid water in the fuel cell stack 12 was performed during the previous operation.
  (d) The battery Bt was removed.

In this manner, the control unit (ECU 72) can comprehensively determine the possibility of freezing of the gas liquid separator section (gas liquid separator 56) in the first determination process base on various conditions in light of different perspectives. For example, even in the case where the state of water in the gas liquid separator section becomes uncertain due to disturbance in the stop state of the fuel cell system 10 (movement of people getting on/getting out of the vehicle, opening/closing of doors, the earthquake, movement of the vehicle 11 by a wrecker/truck, etc.), it becomes possible to determine the possibility of freezing of the gas liquid separator section in the first determination process. Conversely, in the case where various conditions are not satisfied, it is possible to more reliably determine the state of non-freezing of the gas liquid separator section.

Further, in the case where the possibility of freezing of the gas liquid separator section (gas liquid separator 56) is determined, the control unit (ECU 72) continues standby power generation of the fuel cell stack 12, and starts the second determination process after the end of the standby power generation. In this manner, the control unit can warm up the gas liquid separator section by standby power generation. In the state where the gas liquid separator section is frozen to some extent, by defrosting the gas liquid separator section during standby power generation, the freezing state of the gas liquid separator section is terminated.

Further, in the case where the cell voltage difference $\Delta V$ between the cell average voltage Vave of the plurality of power generation cells 20 of the fuel cell stack 12 and the cell voltage Vs of a power generation cell 20 having the lowest voltage, among the plurality of power generation cells 20 becomes not less than a predetermined reference value (freezing determination reference value Sv), the control unit (ECU 72) determines freezing of the gas liquid separator section (gas liquid separator 56), and in the case where the cell voltage difference $\Delta V$ is lower than the reference value, the control unit continues the freezing determination process. In this manner, by monitoring the change of the cell voltage difference $\Delta V$, the control unit can accurately determine freezing of the gas liquid separator section.

In the case where the cell voltage difference $\Delta V$ is lower than the reference value (freezing determination reference value SV), and the temperature of the anode off gas becomes not less than a predetermined freezing determination temperature, or the counted time during the freezing determination process reaches freezing determination time, the control unit (ECU 72) determines non-freezing of the gas liquid separator section (gas liquid separator 56). In this manner, the control unit can also determine the state of non-freezing of the gas liquid separator section accurately.

Further, after determining freezing of the gas liquid separator section (gas liquid separator 56) to open the purge valve 46a for predetermined time, the anode off gas is discharged from the circulation circuit 57 by intermittingly opening the purge valve 46a until defrosting of the gas liquid separator section is determined. In this manner, even after the nitrogen concentration is decreased by opening the purge valve 46a, the fuel cell system 10 can discharge the anode off gas until the gas liquid separator section is defrosted using the purge valve 46a instead of the drain valve 60a.

Further, the cathode system apparatus 16 includes the air pump 16a configured to supply a cathode gas to the fuel cell stack 12 and the cathode discharge channel 66 configured to discharge the cathode off gas from the fuel cell stack 12. The purge channel 46 is coupled to the cathode discharge channel 66, the control unit (ECU 72) increases the rotation speed of the air pump 16a based on opening of the purge valve 46a when freezing of the gas liquid separator section (gas liquid separator 56) is determined. In this manner, at the time of discharging the anode off gas by opening the purge valve 46a, it is possible to suitably dilute the anode off gas by increasing the flow rate of the cathode gas due to the increase in the rotation speed of the air pump 16a.

Further, in the case where freezing of the gas liquid separator section (gas liquid separator 56) is determined, the control unit (ECU 72) determines whether or not the temperature of the anode off gas becomes not less than a predetermined defrosting determination temperature, and after the temperature of the anode off gas becomes not less than the defrosting determination temperature, the control unit counts time until reaching defrosting determination time, and when the counted time reaches the defrosting determination time, the control unit determines defrosting of the gas liquid separator section. In this manner, after the fuel cell system 10 determines freezing of the gas liquid separator section, it is possible suitably determine that the gas liquid separator has been placed in the defrosted state.

Further, according to a second aspect of the present invention, the method of operating the fuel cell system 10 at low temperature is provided. The fuel cell system 10 includes the fuel cell stack 12, the circulation circuit 57 configured to supply an anode gas to the fuel cell stack 12, and circulate an anode off gas discharged from the fuel cell stack 12, and the gas liquid separator section (gas liquid separator 56) provided in the circulation circuit 57, and connected to the fuel cell stack 12, the gas liquid separator section (gas liquid separator 56) being configured to separate liquid water contained in the anode off gas discharged from the fuel cell stack 12 and discharge the water and anode off gas through the drain channel 60, the purge channel 46 provided in the circulation circuit 57 and configured to discharge the anode off gas, and the purge valve 46*a* configured to open/close the purge channel 46, the method including the freezing determination step of determining freezing or non-freezing, after start-up of the fuel cell system 10, and the freezing confirmation process step of, in the case where freezing of the gas liquid separator section is determined, opening the purge valve 46*a* immediately for predetermined time. In this manner, in the method of operating the fuel cell system 10 at low temperature, even in the state where the gas liquid separator section is frozen, it is possible to discharge the anode off gas suitably.

What is claimed is:

1. A fuel cell system comprising:
    a fuel cell stack;
    a circulation circuit configured to supply an anode gas to the fuel cell stack, and circulate an anode off gas discharged from the fuel cell stack;
    a gas liquid separator section provided in the circulation circuit, and connected to the fuel cell stack, the gas liquid separator section being configured to separate liquid water contained in the anode off gas discharged from the fuel cell stack and discharge the anode off gas together with the liquid water through a drain channel;
    a purge channel provided in the circulation circuit, and configured to discharge the anode off gas;
    a purge valve configured to open/close the purge channel;
    a cathode system apparatus including an air pump configured to supply a cathode gas to the fuel cell stack and a cathode discharge channel configured to discharge a cathode off gas from the fuel cell stack; and
    a control unit,
    wherein the purge channel is coupled to the cathode discharge channel,
    wherein the control unit is configured to perform a freezing determination process of determining freezing or non-freezing of the gas liquid separator section after start-up of the fuel cell system, and in a case where freezing of the gas liquid separator section is determined, immediately open the purge valve for predetermined time so that a rotation speed of the air pump is increased based on opening of the purge valve.

2. The fuel cell system according to claim 1, wherein the freezing determination process includes a first determination process of determining whether or not there is a possibility of freezing of the gas liquid separator section, and a second determination process of determining freezing or non-freezing of the gas liquid separator section while continuing power generation of the fuel cell stack, in a case where the possibility of freezing of the gas liquid separator section is determined in the first determination process.

3. The fuel cell system according to claim 2, wherein in the first determination process, in a case where any one of the following conditions (a) to (d) is satisfied, the possibility of freezing of the gas liquid separator section is determined, and in a case wherein none of the following conditions (a) to (d) are satisfied, non-freezing of the gas liquid separator section is determined,
    (a) the temperature of surrounding environment of the fuel cell system is not more than a predetermined temperature;
    (b) during a previous operation, the gas liquid separator section was frozen or there was a possibility of freezing of the gas liquid separator section;
    (c) a scavenging process of discharging liquid water in the fuel cell stack was performed during the previous operation; and
    (d) a battery was removed.

4. The fuel cell according to claim 2, wherein in the case where the possibility of freezing of the gas liquid separator section is determined, the control unit continues standby power generation of the fuel cell stack, and starts the second determination process after an end of the standby power generation.

5. The fuel cell system according to claim 2, wherein in a case where the cell voltage difference between a cell average voltage of a plurality of power generation cells of the fuel cell stack and a cell voltage of a power generation cell having lowest voltage, among the plurality of power generation cells becomes not less than a predetermined reference value, the control unit determines freezing of the gas liquid separator section, and in a case where the cell voltage difference is lower than the reference value, the control unit continues the freezing determination process.

6. The fuel cell system according to claim 5, wherein in a case where the cell voltage difference is lower than the reference value, and a temperature of the anode off gas becomes not less than a predetermined freezing determination temperature, or counted time during the freezing determination process reaches freezing determination time, the control unit determines non-freezing of the gas liquid separator section.

7. The fuel cell system according to claim 1, wherein after the purge valve is opened for the predetermined time, the anode off gas is discharged from the circulation circuit by intermittingly opening the purge valve until defrosting of the gas liquid separator section is determined.

8. The fuel cell system according to claim 1, wherein in the case where freezing of the gas liquid separator section is determined, the control unit determines whether or not a temperature of the anode off gas becomes not less than a predetermined defrosting determination temperature, and
    after the temperature of the anode off gas becomes not less than the defrosting determination temperature, the control unit counts time until reaching defrosting determination time, and when the counted time reaches the defrosting determination time, the control unit determines defrosting of the gas liquid separator section.

* * * * *